US012335719B2

(12) United States Patent
Garcin et al.

(10) Patent No.: US 12,335,719 B2
(45) Date of Patent: Jun. 17, 2025

(54) METHOD FOR RECOVERING A PROFILE OF A MNO

(71) Applicant: THALES DIS FRANCE SAS, Meudon (FR)

(72) Inventors: Florent Garcin, La Ciotat (FR); François Perticara, La Ciotat (FR); Richard Pico, La Ciotat (FR)

(73) Assignee: THALES DIS FRANCE SAS, Meudon (FR)

( * ) Notice: Subject to any disclaimer, the term of this patent is extended or adjusted under 35 U.S.C. 154(b) by 103 days.

(21) Appl. No.: 17/435,456

(22) PCT Filed: Mar. 12, 2020

(86) PCT No.: PCT/EP2020/056680
§ 371 (c)(1),
(2) Date: Sep. 1, 2021

(87) PCT Pub. No.: WO2020/182950
PCT Pub. Date: Sep. 17, 2020

(65) Prior Publication Data
US 2022/0279344 A1    Sep. 1, 2022

(30) Foreign Application Priority Data
Mar. 13, 2019   (EP) .................................... 19305298

(51) Int. Cl.
*H04L 29/06*        (2006.01)
*H04W 8/20*         (2009.01)
(Continued)

(52) U.S. Cl.
CPC ........... *H04W 12/03* (2021.01); *H04W 8/205* (2013.01); *H04W 12/35* (2021.01)

(58) Field of Classification Search
CPC ..... H04W 12/03; H04W 12/35; H04W 8/205; H04L 63/102
See application file for complete search history.

(56) References Cited

U.S. PATENT DOCUMENTS

2009/0163175 A1\*  6/2009  Shi ........................ H04W 12/42
                                                                455/411
2015/0237496 A1   8/2015  Gao et al.
(Continued)

FOREIGN PATENT DOCUMENTS

WO        2017220154        12/2017

OTHER PUBLICATIONS

International Search Report (PCT/ISA/210) and Written Opinion (PCT/ISA/237) mailed on Apr. 29, 2020, by the European patent office as the International Searching Authority for International Application No. PCT/EP2020/056680 (Publication No. WO2020/182950).

*Primary Examiner* — Joseph P Hirl
*Assistant Examiner* — Chi D Nguy

(57) ABSTRACT

Herein provided is a solution to recover a subscription profile of a user that has lost or broken their mobile phone, smartphone, PDA, or other type of terminal. The solution reduces the risk of a subscription clone after having broken or lost their device. In one embodiment, a method herein provides for the recovering of a subscription profile loaded in a secure element that would not otherwise be retrievable from a telecommunication terminals, like eUICCs. The method includes the steps of retrieving the profile downloaded in the first secure element, and then installing it in a second secure element. Other embodiments are disclosed.

6 Claims, 1 Drawing Sheet

(51) Int. Cl.
*H04W 12/03* (2021.01)
*H04W 12/30* (2021.01)

(56) References Cited

U.S. PATENT DOCUMENTS

| | | | |
|---|---|---|---|
| 2016/0330608 A1 | 11/2016 | Benn | |
| 2017/0150356 A1* | 5/2017 | Li | H04W 12/069 |
| 2019/0075453 A1* | 3/2019 | Yoon | H04W 12/06 |
| 2019/0159016 A1* | 5/2019 | Zhang | H04W 8/183 |

* cited by examiner

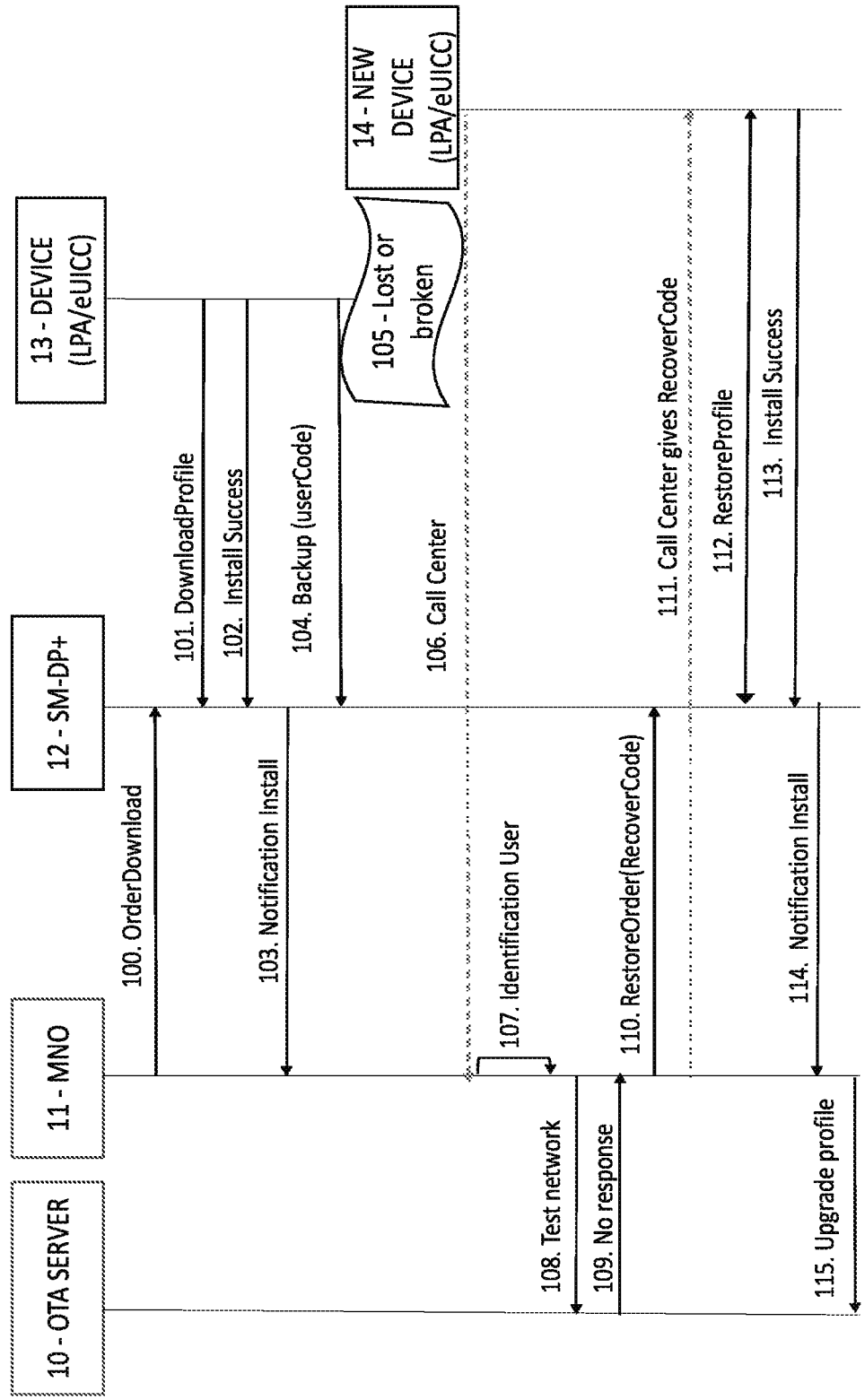

METHOD FOR RECOVERING A PROFILE OF A MNO

BACKGROUND

Field

The invention concerns telecommunications, and in particular, subscriptions loaded on secure elements cooperating with terminals.

INTRODUCTION

An eUICC is a secure element that contains one or more subscription profiles. Each profile enables the eUICC to function in the same way as a removable SIM card issued by the operator that created it. An eUICC may be built using any form factor from the traditional removable card to embedded formats soldered into devices.

SUMMARY

Embodiments of the invention provide a solution to recover the subscription profile of a user that has lost or broken their terminal (a mobile phone, a smartphone, a PDA, . . . ). This reduces the risk to clone the subscription after having broken or lost their device by way of a solution that can implement the specification GSMA SGP.22. More precisely, the invention concerns the recovering of subscriptions profiles loaded in secure elements that are not retrievable from telecommunication terminals, like eUICCs (embedded UICCs, UICC meaning "Universal Integrated Circuit Card") or iUICCs (integrated UICCs).

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

FIG. 1 depicts a flowchart of a method for recovering a profile.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward.

A list of acronyms referenced herein (also from specification GSMA SGP.22) is provided:

ACRONYMS

AES—Advanced Encryption Standard
GSMA—Global Systems for Mobile Communication Association
HLR—Home Location Register
LPA—Local Profile Assistant
MNO—Mobile Network Operator
SM-DP+—Subscription Manager Data Preparation A profile comprises operator data related to a subscription, including the operator's credentials, and potentially, operator or third-party SIM based applications. Profiles are remotely downloaded over-the-air into a eUICC. Although the eUICC is an integral part of the device, the profile remains the property of the operator as it contains items "owned" by the operator (IMSI, ICCID, security algorithms, etc.) and is supplied under license. The content and structure for interoperable Profiles stored on eUICCs are similar to those installed on traditional SIMs. The inter-operable description of these Profiles is defined by the SIMAlliance.

The GSMA Remote SIM Provisioning Consumer solution (GSMA SGP.22) follows a client driven (pull model), and enables control over remote provisioning and local management of operator profiles by the end user of the device. The solution is organized around 4 elements: the SM-DP+ (Subscription Manager-Data Preparation +), the SM-DS (Subscription Manager-Discovery Server), the LPA (Local Profile Assistant) and the eUICC.

When a Sim card is broken or lost, the owner (the end user) can go to a shop of the operator and ask for a new Sim card. This is however not possible for eUICCs or iUICCs when the terminal does not work anymore (a broken phone for example) or if the terminal is lost.

FIG. 1 depicts a flowchart of a method for recovering a subscriber profile in accordance with one embodiment. Reference will be made to this FIGURE in the following example.

If a user has lost his terminal, he can buy another one and download a new profile each time he breaks or loses his terminal, but this implies that the operator will lose an IMSI/Ki and he will have to provision his HLR (Home Location Register) with the new profile. Moreover, the user might change from his previous MNO (Mobile Network Operator) to a new one. This represents a cost for the previous MNO. In this respect, to address this problem, the method provides for recovering a profile of a MNO (11) downloaded in a first secure element integrated in a first terminal (13) at the level of a second secure element integrated in a second terminal (14). The method comprises the steps of:

Transmitting from the first terminal (13) to a SM-DP+ (12) a first secured message (104) containing a personal code of (known by) the user of the first terminal (13) along with a unique identifier of the profile;

After having checked that the first secure element is not operational anymore, sending (110) from the MNO (11) to the SM-DP+ (12) a recover code of (known by) the user and the unique identifier of the profile;

Sending from the second terminal (14) to the SM-DP+ (12) a second secured message (110) containing the recover code, the personal code and a unique identifier of the second secure element; and Comparing at the SM-DP+ (12) the first and second messages and if they correspond, installing in the second secure element the profile and upon installation success, notifying the MNO (11) that the profile has been installed in the second secure element. The first and second messages are preferably secured through hash or AES encryption.

Other features and advantages of the invention will appear by reading the following description of a preferred embodiment in regard of the unique FIGURE that represents a flowchart of a method for recovering a profile.

Referring still to FIG. 1, five elements are represented:

An OTA server 10;

A MNO server 11 (a point of sales, a back-end or a portal of the MNO for example);

A SM-DP+ 12;

A first device 13 comprising a LPA and a eUICC (or a iUICC);

A second device 14 also comprising a LPA and a eUICC (or a iUICC).

A LPA (Local Profile Assistant) is a set of functions in the device responsible for providing the capability to download encrypted Profiles to the eUICC. It also presents the local management end user interface to the end user so they can manage the status of profiles on the eUICC. The principal functions of the LPA may also be in built into the eUICC. The SM-DP+ 12 is responsible for the creation, download, remote management (enable, disable, update, delete) and the protection of operator credentials (the profile). It is given the + designation as it encapsulates the functions of both the SM-DP (Subscription Manager-Data Preparation) and the SM-SR (Subscription Manager-Secure Routing) of the M2M (Machine to Machine) solution.

Referring still to FIG. 1, the steps of the method are now explained. Briefly, steps 100 to 103 are already existing in the GSMA specification: At step 100, the MNO server 11 using GSMA specification books the subscription for the end user. An OrderDownload message is sent to the SM-DP+ 12. The latter waits for a request to download this subscription (profile) in a secure element. At step 101, the end user downloads the profile (using a QR code for example that is photographed by the user thanks to his device 13). A message "DownloadProfile" is sent to the SM-DP+ 12. The profile is then downloaded in the secure element (called first secure element) comprised in the first device 13 and at step 102, the subscription is correctly installed on the first device 13 and this information is sent to the server (Install Success). At step 103, the SM-DP+ 12 forwards the notification to the MNO server 11.

The communications between the MNO server 11 and the SM-DP+ 12 are done on the ES2+ channel and those between the device 13 and the SM-DP+ 12 are done on the ES9+ channel as defined by the GSMA.

The inventive method provides the following steps for later retrieving the profile downloaded in the first secure element, and for installing it in a second secure element: At step 104, automatically after an installation success, the LPA of the first device 13 proposes to the end user to create a backup of his/her profile in case of issue. If the end user accepts, a personal code is requested. This is the UserCode. The UserCode is securely provided to the SM-DP+ 12, for example:

hashed UserCode=SHA256(SHA256(UserCode)|IC-CID), which is signed by eUICC's credential, and where '1' means concatenation of data. The aim is to trust backup order from end user. SHA 256 is only an example, other hash functions can be used.

At step 105, after a while, the end user breaks or loses his first device 13. He/she communicates with the MNO Center 11 (mail, phone, tchat, shop, etc. . . . ) at step 106. At step 107, the MNO 11 checks the end user with his usual process (personal question, password, etc, . . . ). MNO 11 gets information, such as the name or MSISDN. With the notification received at step 103, the MNO is then able to find the correct profile for this user (he associates the ICCID with the profile). At step 108, the MNO 11 will test the MSISDN of this user. He/she can, for example, try to localize it, to make one audit, to send a SMS, etc. . . . . At step 109, no response comes from the first device 13.

At step 110, when the MNO 11 is sure of himself/herself (the first secure element is not operational anymore), all verification and procedure done, the MNO 11 requests from the user his/her UserCode and the EID (identifier of his new device 14). The MNO 11 sends to the SM-DP+ 12 the following parameters: UserCode, RecoverCode, ICCID (of the first device 13), new EID (eUICC-ID of the second device 14). At reception of these parameters, the SM-DP+ 12 will check the UserCode (linked to the ICCID). If OK, the SM-DP+ 12 will prepare the subscription profile to be ready for a download on the new secure element. At step 111, the MNO 11 gives to the end user the "RecoverCode". This can be done by e-mail, chat or by phone for example. At step 112, the end user clicks on the button RESTORE on his LPA. The UserCode and the RecoverCode are requested and the RecoverCode is provided to the SM-DP+ 12, for example: Hashed RecoverCode=SHA256 (SHA256 (Recover Code)|SHA256 (SHA256 (UserCode)|ICCID)). The aim is to trust recover order from the end user. The SM-DP+ 12 is able to compute the Hashed RecoverCode since he knows the UserCode and the RecoverCode.

After comparison of the two hashes, if they are equal, the download of the profile is done. At step 113, the second device informs the SM-DP+ 12 that the installation was successful (same as step 102) in https. At step 114, an installation success notification is sent to the MNO 11 (same as step 103) and at step 115, the MNO 11 could request to the OTA server 10 to send all updates needed for this profile. The UserCode is preferably, for the sake of simplicity, the last PIN code chosen by the user of the first terminal. So, even if the user loses his first terminal, he will remember his last PIN code. This can be done automatically: When the user changes his PIN code, it is considered as being the UserCode and sent to the SM-DP+ 12. Instead of using hash functions, it is also possible to use AES with SCP03t:

Briefly referring back to the method, at step 101, it is known to establish ephemeral session keys for securing the download of the profile. The SM-DP+ 12 encrypts the profile and the eUICC 13 decrypts it. This mechanism can be used inversely at step 104: Other ephemeral session keys are generated and the eUICC 12 encrypts the UserCode that is then decrypted by the SM-DP+ 12. At step 112, the second message is encrypted using AES. This procedure is described in SGP 22v.2.2.

Advantageously, if the profile is really lost, there is the possibility to download again the same profile. This:

represents a gain of IMSI/KI for the MNO (re-use without IMSI/KI cloning);

avoids any rework/provisioning on HLR for the MNO (better go to market);

gives a way to retain the end user of the initial MNO;

permits to the end user to recover a quick connectivity.

What is claimed is:

1. A method for recovering a profile of a MNO downloaded in a first secure element integrated in a first terminal, wherein said first terminal is unavailable and/or not operational, at the level of a second secure element integrated in a second terminal, said method comprising:

Transmitting from said first terminal to a SM-DP+ a first secured message containing a personal code known by the user of said first terminal along with a unique identifier of said profile, before said first terminal has become unavailable and/or not operational, wherein said personal code and said unique identifier correspond to a backup of said profile, wherein said backup of said profile is identical to said profile;

After having tested that said first secure element is not operational anymore, sending from said MNO to said SM-DP+ a recover code known by said user and said unique identifier of said profile;

Sending from said second terminal to said SM-DP+ a second secured message containing said recover code, said personal code and a unique identifier of said second secure element;

Comparing at said SM-DP+ said first and second secured messages and if they correspond, transmitting to said second terminal said backup of said profile, installing in said second secure element said backup of said profile and, upon installation success, notifying said MNO that said backup of said profile has been installed in said second secure element.

2. Method according to claim 1, wherein said first and second secured messages are secured through hash.

3. Method according to claim 1, wherein said first and second secured messages are secured through AES encryption.

4. The system of claim 3, wherein said first secure element secures said first secured message with a hash and said second secure element secures said second secured messages with a hash.

5. The system of claim 4, wherein said first and second secured messages are secured through AES encryption.

6. A system for recovering a profile of a MNO, comprising a SM-DP+;

a MNO;

a first terminal having a first secure element therein integrated with a profile of a MNO thereon, wherein said first terminal is at least one of a mobile phone, a smartphone and a PDA, wherein said first terminal is unavailable and/or not operational; and a second terminal having a second secure element therein integrated;

wherein, said first terminal:

transmits to said SM-DP+ a first secured message containing a personal code known by the user of said first terminal along with a unique identifier of said profile, before said first terminal has become unavailable and/or not operational, wherein said personal code and said unique identifier correspond to a backup of said profile, wherein said backup of said profile is identical to said profile, wherein said MNO;

tests that said first secure element is not operational anymore, and, if so, sends to said SM-DP+ a recover code of said user and said unique identifier of said profile, wherein, said second terminal;

sends to said SM-DP+ a second secured message containing said recover code, said personal code and a unique identifier of said second secure element, and wherein said SM-DP+;

compares said first and second secured messages and if they correspond, transmits to said second terminal said backup of said profile, installs in said second secure element said backup of said profile, and upon installation success, notifies said MNO that said backup of said profile has been installed in said second secure element.

* * * * *